United States Patent
Yun (10) Patent No.: US 8,819,947 B2
(45) Date of Patent: Sep. 2, 2014

(54) LEVEL DEVICE FOR A SHOE

(76) Inventor: Ji Hae Yun, Daejeon (KR)

(*) Notice: Subject to any disclaimer, the term of this patent is extended or adjusted under 35 U.S.C. 154(b) by 189 days.

(21) Appl. No.: 13/390,523

(22) PCT Filed: Aug. 9, 2010

(86) PCT No.: PCT/KR2010/005201
§ 371 (c)(1),
(2), (4) Date: Feb. 15, 2012

(87) PCT Pub. No.: WO2011/021801
PCT Pub. Date: Feb. 24, 2011

(65) Prior Publication Data
US 2012/0137530 A1    Jun. 7, 2012

(30) Foreign Application Priority Data

Aug. 17, 2009 (KR) .................. 10-2009-0075796
Sep. 8, 2009 (KR) .................. 10-2009-0084403
Aug. 4, 2010 (KR) .................. 10-2010-0075164

(51) Int. Cl.
*A43D 1/00* (2006.01)
*G01C 9/26* (2006.01)
*G01C 9/18* (2006.01)

(52) U.S. Cl.
USPC .................. 33/3 A; 33/370; 33/379

(58) Field of Classification Search
USPC .................. 33/3 R, 3 A, 347, 370, 379
See application file for complete search history.

(56) References Cited

U.S. PATENT DOCUMENTS

| | | | | |
|---|---|---|---|---|
| 5,500,635 | A * | 3/1996 | Mott | 33/3 A |
| 5,820,476 | A * | 10/1998 | Amato | 33/370 |
| 6,665,962 | B2 | 12/2003 | Shepherd | |
| 8,474,146 | B2 * | 7/2013 | Hartford et al. | 33/3 A |
| 2008/0040937 | A1 * | 2/2008 | Champoux et al. | 33/6 |
| 2009/0320302 | A1 * | 12/2009 | Boyd | 33/262 |

FOREIGN PATENT DOCUMENTS

| | | |
|---|---|---|
| JP | 2005-296114 | 10/2005 |
| KR | 20-1988-0017241 | 10/1988 |
| KR | 20-0184593 | 12/1999 |
| KR | 20-0200026 | 3/2000 |
| KR | 2009-0052132 | 5/2000 |
| KR | 10-0796797 | 1/2008 |

* cited by examiner

*Primary Examiner* — G. Bradley Bennett
(74) *Attorney, Agent, or Firm* — Novick, Kim & Lee, PLLC; Jae Youn Kim (57) ABSTRACT

Embodiments of the present invention provide a level device for a shoe in which particular portions of shoes which may easily contact and/or collide with the ground or other objects may be embraced and thus protected with a separate cover unit and, at the same time, a surface state of any given location may be visually determined, and, hence, first, the shoes may be prevented from damage and thus have improved durability, second, the separate cover unit may decorate the shoes to achieve aesthetic improvement, thereby providing high quality and/or diverse designs of the shoes, and, third, the shoe-wearer may visually determine in a simple and convenient manner whether a location where the wearer is standing is level or not and if not, the direction and extent of the grade.

22 Claims, 9 Drawing Sheets

LEVEL DEVICE FOR A SHOE

BACKGROUND

1. Field

Embodiments of the present invention relate to a level device for a shoe which is installed on a shoe to allow the shoe-wearer to visually determine whether a location where the wearer is standing is level or not and if not, the direction and extent of the grade.

2. Description of the Related Art

A level device is installed on general types of footwear such as exercise shoes, leather shoes, or the like to allow the shoe-wearer to check how the wearer is walking and to assist the wearer in correcting a walking posture. Alternatively, a level device is installed on professional types of footwear such as golf shoes, work shoes, or the like to allow the shoe-wearer to visually determine whether a location where the wearer is standing is level or not and if not, the direction and extent of the grade. Thus, as to golf, the golfer may improve putting performances using the level device installed on the golf shoes. As to construction, the worker may improve working efficiency using the level device installed on the work shoes.

Such a level device for a shoe is disclosed in Korean Utility Model Registration Number 20-0184593 registered on Jun. 1, 2000 in which a golf shoe includes a level unit attached to a top of a front portion of the golf shoe and a member disposed beneath the level unit to maintain a level state.

Moreover, Korean Utility Model Registration Number 20-0200026 registered on Oct. 16, 2000 discloses a golf shoe including a level unit attached and fixed to an inner side of a heel of the golf shoe.

In these conventional golf shoes, the level device is attached to top of the front portion or an inner side of the heel of the golf shoe, to allow the golfer to determine the grade or slope of a field or green on which the golfer is standing and to assist the golfer in determining an approach posture, which direction and to what magnitude the ball will "break" after it has been struck. Thus, the level device installed on the golf shoe may advantageously improve skills of the golfer.

However, in these conventional golf shoes, since the level device is disposed on the top of the front portion or is attached to the inner side of the heel of the shoe, the level may interfere with bending and unbending of a foot of the golfer or wearer when the golfer is walking, putting or driving the ball. Moreover, when the golfer or wearer is standing, a bottom end of the wearer or golfer's pants may screen the level device, so that it may be difficult for the golfer or wearer to check the level device. Further, the golf shoe may have an unaesthetic appearance and thus the golfer or wearer may dislike wearing the golf shoe in question.

Meanwhile, in order to solve the above problems, Korean Patent Application Publication Number 2009-0052131 published on May 25, 2009 "A shoe including a level device" and Korean Patent Application Publication Number 2009-0052132 published on May 25, 2009 "A golf shoe including a level device", both authored by the same inventor as the present invention, have been published.

In these documents authored by the inventor of the present invention, an X directional level device and a Y directional level device are respectively installed at a front edge and a side edge of a shoe sole or a shoe upper. The X directional level device and Y directional level device respectively indicate a front-back direction slope and a left-right direction slope of the location where the wearer of the general type shoes or the golf shoes is standing. Since the X directional level device and the Y directional level device are respectively installed at the front edge and the side edge of the shoe sole or the shoe upper, the level devices may not interfere with bending and unbending of a foot of the wearer when the wearer (golfer) is walking, putting and/or driving the ball. Moreover, when the wearer (golfer) is standing, a bottom end of the wearer's pants may not screen the level devices, so that it may be easy for the wearer (golfer) to check the level devices. Further, the shoes having the level devices may not have an unaesthetic appearance and thus the golfer may enjoy wearing the shoes.

However, in these documents authored by the inventor of the present invention, the X directional level device and the Y directional level device are configured and installed to function only to measure the state of the surface of the location. Thus, the level device may not be expected to prevent the general type shoe and/or the golf shoes from damage and/or to improve the quality thereof.

That is, the X directional level device and the Y directional level device respectively installed at the front edge and the side edge of the shoe sole or the shoe upper of the general type shoe and/or the golf shoes have not components to protect and decorate the appearance of the general type shoes and/or the golf shoes. Therefore, when the wearer or golfer is moving on foot or rounding the golf course, the front edge or the side edge of the general type shoes or the golf shoes which may easily contact and/or collide with the ground or other objects may be easily damaged. As a result, the general type shoes or the golf shoes may easily wear out and become deteriorated in appearance and have a shortened lifespan. Further, it may be difficult to provide high quality shoes and diverse designs of shoes to meet the needs of the consumers, especially, who demand shoes with high quality and diverse designs.

SUMMARY

An aspect of the present invention has been made in view of the above points and thus aims to provide a level device for a shoe in which particular portions of shoes easily being in contact with and/or colliding with the ground or other objects may be embraced and thus protected with a separate cover unit and at the same time a surface state of any given location may be visually measured, and, hence, first, the shoes may be prevented from damage and thus have improved durability, second, the separate cover unit may decorate the shoes to achieve aesthetic improvement, thereby providing the high quality and/or diverse designs of the shoes, and, third, the shoe-wearer may visually determine in a simple and convenient manner whether a location where the wearer is standing is level or not and if not, the direction and extent of the grade.

Additional aspects of the invention will be set forth in part in the description which follows and, in part, will be obvious from the description, or may be learned by practice of the invention.

In accordance with one aspect of the present invention, a level device 1 for a shoe may include a shoe cover unit 10 made of a material having excellent wear-resistance and impact-resistance to be configured to be attachable to a front portion A of a shoe 2 so as to embrace the front portion A of the shoe 2, and a surface measuring unit 20 including a level unit 20a disposed at the shoe cover unit 10 to enable a visual check of a surface state of a given location.

That is, the level device 1 for a shoe according to this aspect of the invention embraces and thus protects and decorates the front portion B of the shoe 2 using the shoe cover unit 10 made of the material having excellent wear-resistance and impact resistance and at the same time enables the wearer of the shoe 2 to easily visually determine using the level unit 20a included in the surface measuring unit 20 whether a location where the wearer is standing is level or not and if not, the direction and extent of the grade.

Accordingly, the level device 1 may have the following effects. First, when the wearer of the shoes such as the work shoes, exercise shoes, leather shoes, etc. is moving on foot or the wearer of the golf shoes is rounding the golf course or is putting or driving the ball, the shoe cover unit 10 protects from the damage the front portion A of the shoe 2 which may, otherwise, may be damaged due to being in contact with and/or collision with the ground or other objects. Thus, the shoes may be kept as clean as new shoes and have an extended lifespan. Second, since the shoe cover unit 10 embraces and decorates the front portion A of the shoe 2 to provide the shoes with improved aesthetics and thus to meet the needs of the consumers, especially, who demand shoes with high quality and diverse designs. Third, by reading the surface measuring unit 20 including the level unit 20a installed in the shoe cover unit 10, the wearer of the general footwear such as exercise shoes, leather shoes, or the like may check how the wearer is walking and accordingly correct a walking posture. Further, by reading the surface measuring unit 20, the wearer of the professional type of footwear such as golf shoes, work shoes, or the like may visually determine whether a location where the wearer is standing is level or not and if not, the direction and extent of the grade. Thus, as to golf, the golfer may improve his/her putting performance and, as to construction, the worker may improve working efficiency.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments of the present invention, examples of which are illustrated in the accompanying drawings, wherein like reference numerals refer to like elements throughout.

Below, level devices for a shoe according to various embodiments of the present invention will be described in detail with reference to the accompanying drawings.

A shoe cover unit 10 is a component to embrace and protect a front portion A of a shoe 2.

Figure 1:
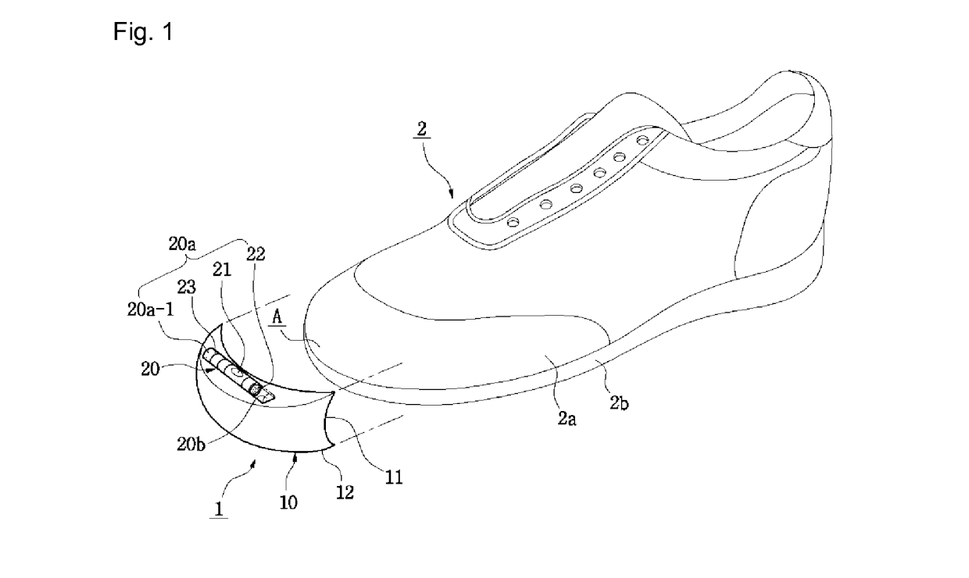
FIG. 1 is a partial perspective view illustrating a state in which a level device for a shoe according to one embodiment of the invention is separated with a shoe before being attached to a front portion of the shoe.
Figure 2:
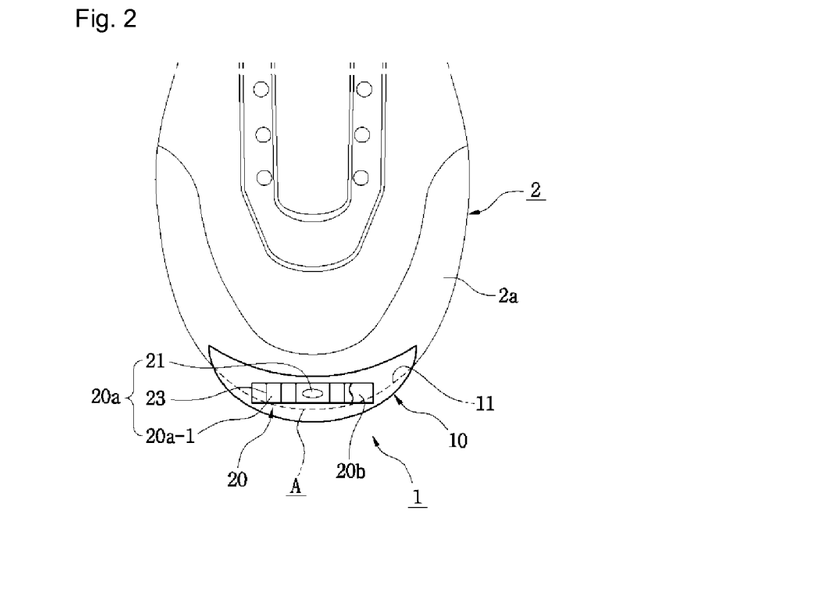
FIG. 2 is a partial top view illustrating a state in which a level device for a shoe according to one embodiment of the invention is attached to a front portion of a shoe.
Figure 3:
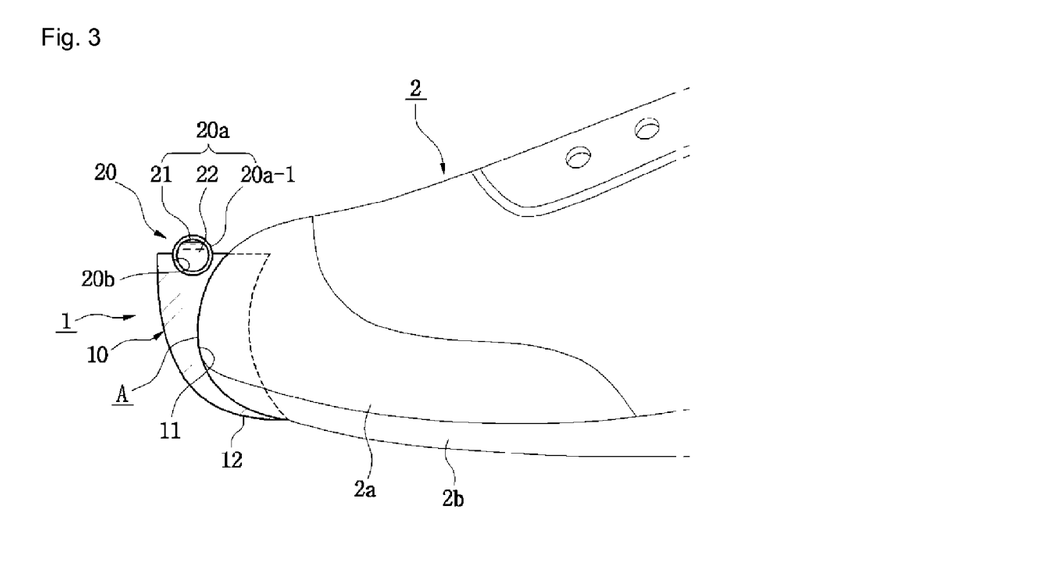
FIG. 3 is a side elevation view corresponding to FIG. 2.

In accordance with one embodiment of the present invention as shown in FIG. 1 to FIG. 3, the shoe cover unit 10 is has an arcuate form and has an inner facing surface 11 in a concave shape which faces and attaches to the front portion A of the shoe 2. The shoe cover unit 10 may prevent the front portion A of the shoe 2 from being damaged due to friction against or collision with the ground or other objects. The inner facing surface 11 of the shoe cover unit 10 is securely attached to the front portion A of the shoe 2 using an adhesive agent applied to the inner facing surface 11.

The shoe cover unit 10 is preferably made of any one of a synthetic resin and a rubber, etc. which is lightweight and has excellent wear-resistance. Therefore, the shoe 2 including a level device 1 according to embodiments of the invention disposed thereon by attaching the shoe cover unit 10 to the front portion A of the shoe 2 may be prevented from weight gain, thereby improving comfort thereof, and, at the same time, may sufficiently endure friction against or collision with the ground or other objects at the front portion A due to the shoe cover unit 10.

The shoe cover unit 10 has a large thickness (a front-back directional length) of an upper portion thereof so as to receive a surface measuring unit 20 including a level unit 20 in the upper portion thereof.

The thickness of the shoe cover unit 10 may be increasingly small from the upper portion thereof to a lower portion thereof. The shoe cover unit 10 may have a sole protection portion 12 to extend inwardly in a curved manner in a lower end portion thereof so as to cover a sole 2b as shown in FIG. 3. Thus, the shoe cover unit 10 may embrace and protect both an upper 2a and the sole 2b at the front portion A of the shoe 2 not including an edge projecting outwardly such as the exercise shoes, etc.

Figure 4:
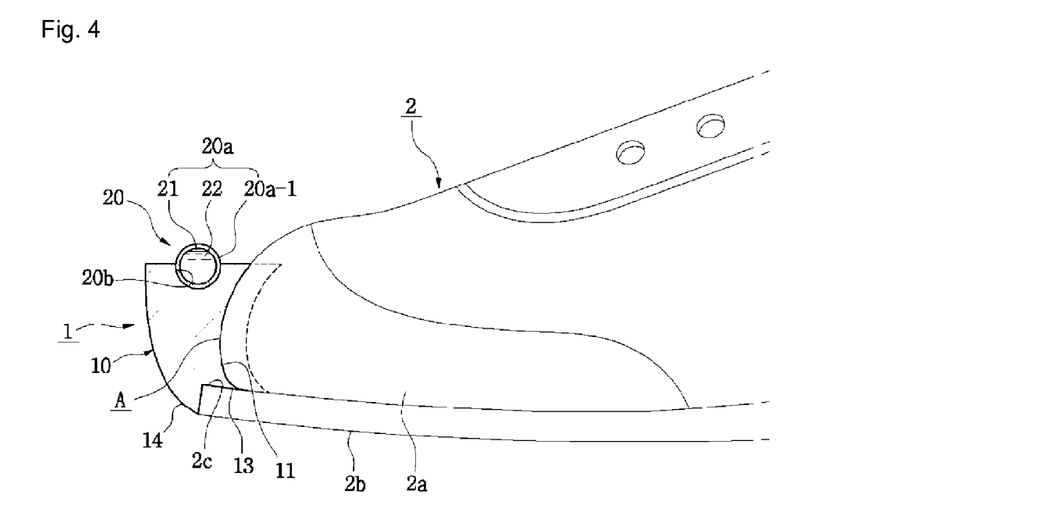
FIG. 4 is a side elevation view illustrating a state in which a level device for a shoe according to one embodiment of the invention including a shoe cover unit having a supported portion and a sole protection portion is attached to a front portion of the shoe.

In accordance with one embodiment of the invention as shown in FIG. 4, the shoe cover unit 10 may have a supported portion 13 horizontally formed at a lower end portion thereof. The supported portion 13 is supported on a sole edge 2c projecting outwardly at the front portion A of the shoe 2 such as work shoes, golf shoes, leather shoes, etc., so that the shoe cover unit 10 embraces and protect the upper 2a in a more stable manner. In this case, the shoe cover unit 10 may have an auxiliary sole protection portion 14 to vertically extend from an outermost point of the supported portion 13. In this way, the upper 2a at the front portion A of the shoe 2 may be embraced and protected by a main portion of the shoe cover unit 10 while the sole edge 2c at the front portion A of the shoe 2 may be embraced and protected by the auxiliary sole protection portion 14 of the shoe cover unit 10.

Figure 5:
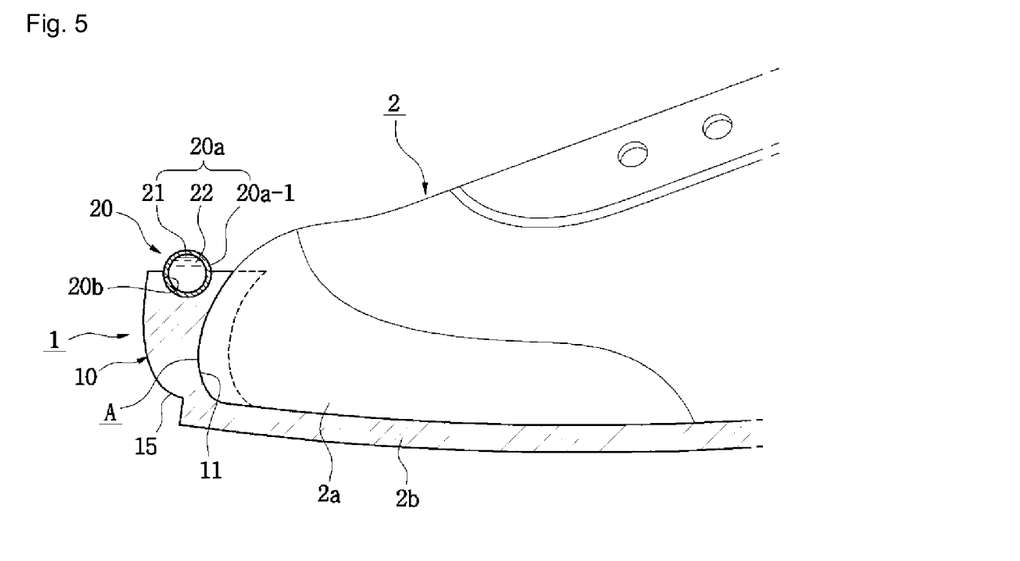
FIG. 5 is a side elevation view illustrating a state in which a level device for a shoe according to one embodiment of the invention including a shoe cover unit having a connection portion is attached to a front portion of the shoe.

In accordance with one embodiment of the invention as shown in FIG. 5, the shoe cover unit 10 may have a connection portion 15 formed at a lower end portion thereof so as to be connected to a front end of the sole 2b of the shoe 2. Thus, the shoe cover unit 10 is integrated with the sole 2b of the shoe 2. In this way, when manufacturing the shoe 2, both the shoe cover unit 10 and the sole 2b may be attached to the upper 2a at once, thereby simplifying the manufacturing process of the shoe 2 and thus improving the productivity of the shoe 2.

A surface measuring unit 20 is a component to measure a grade or slope of the surface of any given location using a level unit 20a included therein.

In accordance with one embodiment of the present invention as shown in FIG. 1 to FIG. 3, the surface measuring unit 20 includes the level unit 20a disposed in the upper portion of the shoe cover unit 10 to enable the wearer of the shoe 2 to visually determine, using level unit 20a, whether a location where the wearer is standing is level or not and if not, the direction and extent of the grade.

Figure 6:
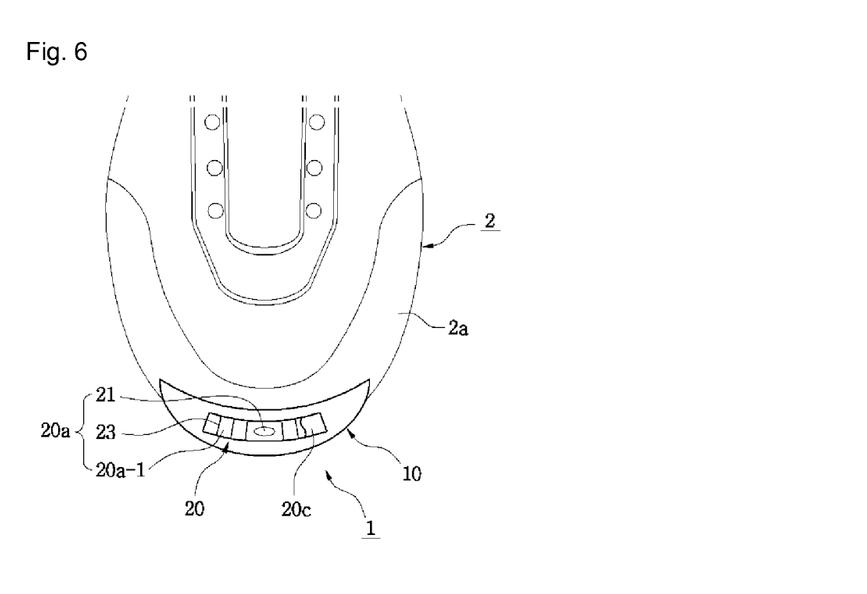
FIG. 6 is a partial top view illustrating a state in which a level device for a shoe according to one embodiment of the invention including a surface measuring unit having a curved elongated level unit is attached to a front portion of the shoe.

The surface measuring unit 20 is configured such that a straight elongated groove 20b is formed in a left-right direction in a flat surface of the upper portion of the shoe cover unit 10 and a straight elongated level unit 20a is inserted in and mounted on the elongated groove 20b so that an upper portion thereof projects from the flat surface. Alternatively, as shown in FIG. 6, the surface measuring unit 20 may be configured such that a curved elongated groove 20c is formed in a left-right direction in a flat surface of the upper portion of the shoe cover unit 10 and a curved elongated level unit 20a is inserted in and mounted on the curved elongated groove 20c so that an upper portion thereof projects from the flat surface. Moreover, the grooves 20b and/or 20c may have any one of a semi-cylindrical shape and an elongated hexahedral shape. The shape of the grooves is not limited thereto.

Here, the straight elongated groove 20b and/or the curved elongated groove 20c are formed in the flat surface of the upper portion of the shoe cover unit 10 so as to have any one of a semi-cylindrical shape and an elongated hexahedral shape. The straight elongated level unit 20a and/or the curved elongated level unit 20a are formed to have any one of a semi-cylindrical shape and an elongated hexahedral shape in a corresponding manner to the shape of the straight elongated groove 20b and/or the curved elongated groove 20c. The straight elongated level unit 20a and/or the curved elongated level unit 20a are respectively fitted in the straight and/or curved elongated grooves 20b and 20c. At this time, there may be used an adhesive agent in order to fix the straight elongated level unit 20a and/or the curved elongated level unit 20a to the straight and/or curved elongated grooves 20b and 20c respectively. The upper portions of the straight and/or curved elongated level units 20a are not buried in the straight and curved elongated grooves 20b and 20c and, hence, project upwardly from the flat surface of the upper portion of the shoe cover unit 10. The projected upper portions of the straight and curved elongated level units 20a have any one of the semi-cylindrical shape and the elongated hexahedral shape.

In accordance with one embodiment of the invention, the level unit 20a of the surface measuring unit 20 is formed as follows. A separate transparent case 20a-1 having an open side receives, through the open side, liquid 22 containing a bubble 21 therein, and the open side of the transparent case 20a-1 is sealed in a state in which liquid 22 is received in the case 20a-1, and a plurality of scales 23 is marked on an outer surface of the case 20a-1 at a regular interval in a longitudinal direction, and then the separate transparent case 20a-1 is fitted in and fixed to the curved or straight elongated groove 20c or 20b formed in the flat surface of the upper portion of the shoe cover unit 10 such that the scales 23 are exposed to the outside. Therefore, the bubble 21 in the transparent case 20a-1 may move and point to the scale 23 depending on whether a location where the wearer is standing is level or not and if not, the direction and extent of the grade. At this time, by reading the scale, the wearer may visually determine whether a location where the wearer is standing is level or not and if not, the direction and extent of the grade. The open side of the separate transparent case 20a-1 may be sealed by the same transparent material as the material of the transparent case using thermal attachment or via an adhesive agent, etc.

Figure 7:
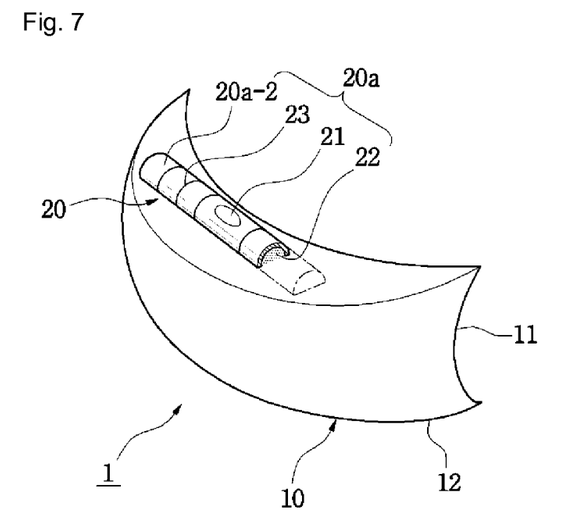
FIG. 7 is a partial perspective view of a level device for a shoe according to one embodiment of the invention, for a front portion of the shoe, including a surface measuring unit having a level unit formed with an integrated transparent case.

In accordance with one embodiment of the invention as shown in FIG. 7, the level unit 20a of the surface measuring unit 20 is formed as follows. A transparent case 20a-2 is formed in an integrated manner with the shoe cover unit 10 so as to project upwardly from the surface of the upper portion of the shoe cover unit 10 using a transparent material and to have one open side, and liquid 22 is injected in the transparent case 20a-2 through the open side so as to contain the bubble 21 therein, and the open side of the transparent case 20a-2 is sealed in a state in which liquid 22 is received in the case 20a-2, and a plurality of scales 23 is marked on an outer surface of the case 20a-2 at a regular interval in a longitudinal direction. In this manner, the level unit 20a of the surface measuring unit 20 is integrated with the shoe cover unit 10, and, hence, both the shoe cover unit 10 and the surface measuring unit 20 may be formed using a single mold at once. This may greatly reduce a mold cost for the level device 1 for the shoe and thus a manufacturing cost of the level device 1. The integrated transparent case 20a-2 may be formed to have any one of a semi-cylindrical shape and an elongated hexahedral shape while having one open side. The open side of the integrated transparent case 20a-2 may be sealed using a transparent sealing material after liquid 22 has been injected therethrough.

Figure 8:
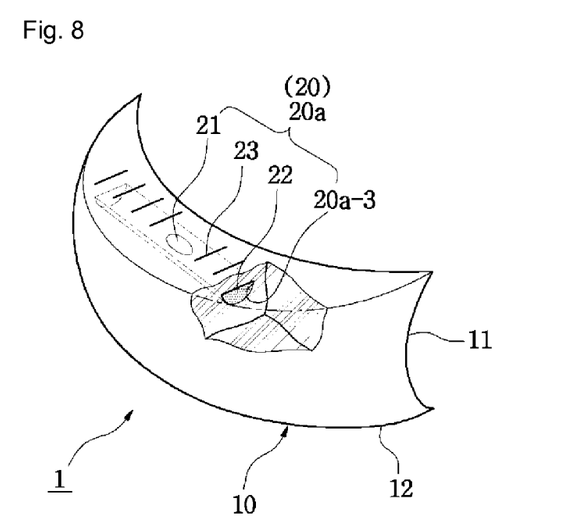
FIG. 8 is a partial perspective view of a level device for a shoe according to one embodiment of the invention, for a front portion of the shoe, including a surface measuring unit having a level unit in a form of a level formation elongated hole.

In accordance with one embodiment of the invention as shown in FIG. 8, the level unit 20a of the surface measuring unit 20 is formed as follows. A level formation elongated hole 20a-3 is formed to be buried beneath the surface of the upper portion of the shoe cover unit 10 made of a transparent material so as to have one side portion communicating with the outside, and liquid 22 is injected into the level formation elongated hole 20a-3 through one side portion communicating with the outside so as to contain the bubble 21 therein, and one side portion communicating with the outside is sealed in a state in which liquid 22 is received in the hole 20a-3, and a plurality of scales 23 is marked on the surface of the upper portion of the shoe cover unit 10 at a regular interval in a longitudinal direction so as to be disposed immediately over the level formation elongated hole 20a-3. In this manner, the level unit 20a of the surface measuring unit 20 is buried in the transparent shoe cover unit 10, and, hence, may be protected from external impact. Thus, the surface measuring unit 20 may be protected from damage and thus have an extended lifespan. The level formation elongated hole 20a-3 may be formed to have any one of a semi-cylindrical shape and an elongated hexahedral shape while having one side portion communicating with the outside. One side portion communicating with the outside may be sealed using a transparent sealing material after liquid 22 has been injected therethrough.

Figure 9:
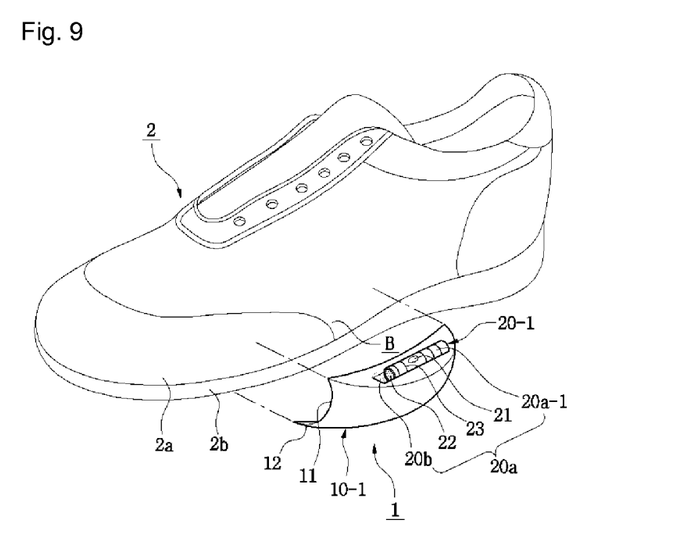
FIG. 9 is a partial perspective view illustrating a state in which a level device for a shoe according to one embodiment of the invention is separated from a shoe before being attached to a side portion of the shoe.
Figure 10:
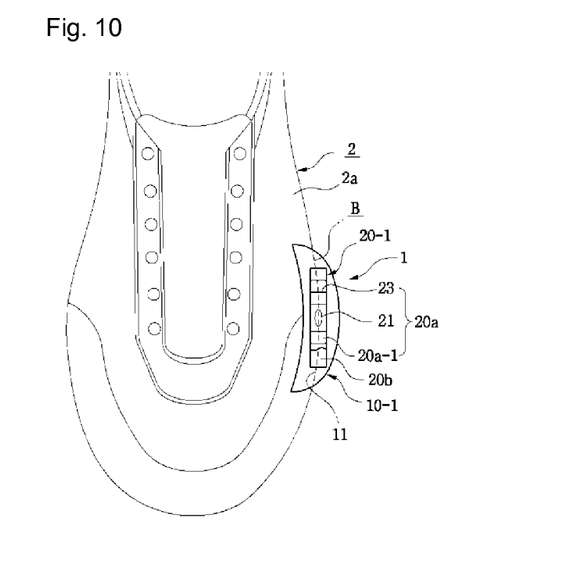
FIG. 10 is a partial top view illustrating a state in which a level device for a shoe according to one embodiment of the invention is attached to a side portion of a shoe.
Figure 11:
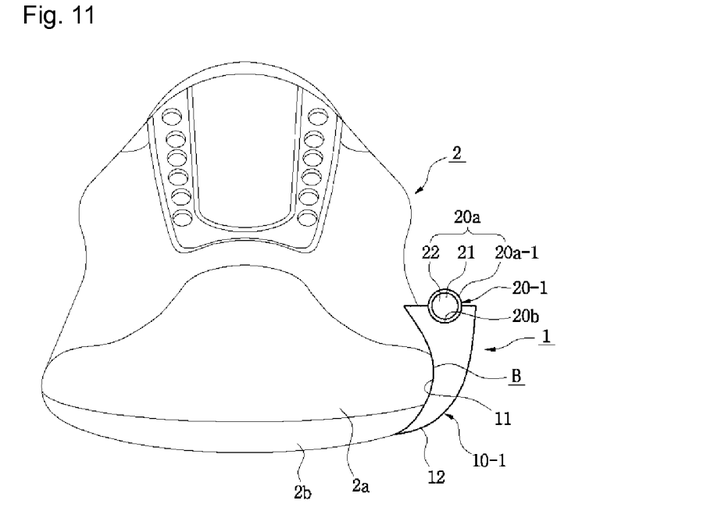
FIG. 11 is a front elevation view corresponding to FIG. 10.

FIG. 9 to FIG. 11 illustrate level devices according to embodiments of the invention.

In accordance with these embodiments of the invention, a level device 1 for a shoe includes a shoe cover unit 10-1 made of a material having excellent wear-resistance and impact resistance to be configured to be attachable to a side portion B of a shoe 2 so as to embrace the side portion B of the shoe 2, and a surface measuring unit 20-1 including a level unit 20a disposed in the upper portion of the shoe cover unit 10-1 to enable the wearer of the shoe to visually determine, using the level unit 20a, whether a location where the wearer is standing is level or not and if not, the direction and extent of the grade.

The level device 1 for a shoe according to these embodiments of the invention embraces and thus protects and decorates the side portion B of a shoe 2 using the shoe cover unit 10-1 made of the material having excellent wear-resistance and impact resistance and at the same time enables wearer of the shoe 2 to visually determine, using the level unit 20a included in the surface measuring unit 20-1, whether a location where the wearer is standing is level or not and if not, the direction and extent of the grade. Accordingly, the level device 1 may have the following effects. First, when the wearer of the shoes such as the work shoes, exercise shoes, leather shoes, etc. is moving on foot or the wearer of the golf shoes is rounding the golf course or is putting or driving the ball, the shoe cover unit 10-1 protects the side portion B of the shoe 2 from damage, which may, otherwise, be damaged due to contact with and/or collision with the ground or other objects. Thus, the shoes may be kept as clean as new shoes and have an extended lifespan. Second, since the shoe cover unit 10-1 embraces and decorates the side portion B of the shoe 2 to provide the shoes with improved aesthetics and thus to meet the needs of the consumers, especially, who demand shoes with high quality and diverse designs. Third, by reading the surface measuring unit 20-1 including the level unit 20a installed in the shoe cover unit 10-1, the wearer of the general types of footwear such as exercise shoes, leather shoes, or the like may check how the wearer is walking and accordingly correct a walking posture. Further, by reading the surface measuring unit 20-1, the wearer of the professional type of footwear such as golf shoes, work shoes, or the like may visually determine whether a location where the wearer is standing is level or not and if not, the direction and extent of the grade. Thus, as to golf, the golfer may improve putting performances and, as to construction, the worker may improve working efficiency.

In accordance with these embodiments of the invention, the shoe cover unit 10-1 has an arcuate form and has an inner facing surface 11 in a concave shape which faces and attaches to the side portion B of the shoe 2. The shoe cover unit 10-1 may protect the side portion B of the shoe 2 from damage due to friction against or collision with the ground or other objects. The inner facing surface 11 of the shoe cover unit 10-1 is securely attached to the side portion B of the shoe 2 using an adhesive agent applied to the inner facing surface 11.

The thickness of the shoe cover unit 10-1 may be increasingly small from an upper portion thereof to a lower portion thereof. The shoe cover unit 10-1 may have a sole protection portion 12 to extend inwardly in a curved manner at a lower end portion thereof so as to cover a sole 2b as shown in FIG. 11. Thus, the shoe cover unit 10-1 may embrace and protect both an upper 2a and the sole 2b at the side portion B of the shoe 2 not including an edge projecting outwardly such as the exercise shoes, etc.

Figure 12:
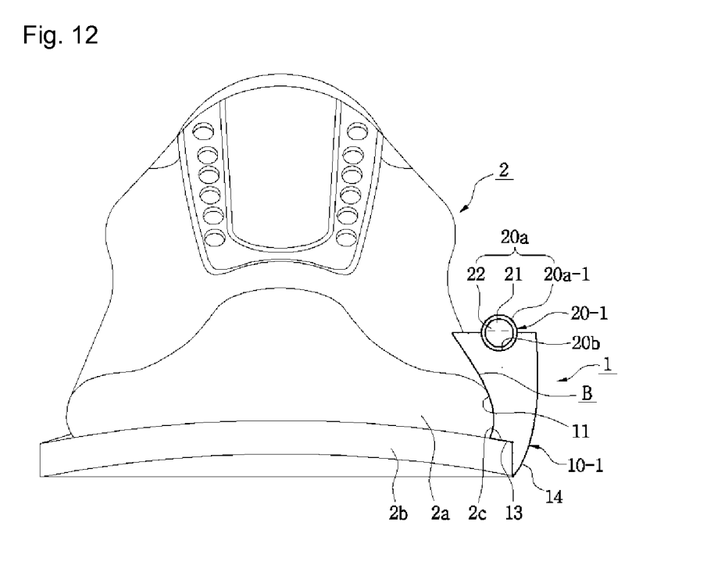
FIG. 12 is a front elevation view illustrating a state in which a level device for a shoe according to one embodiment of the invention including a shoe cover unit having a supported portion and a sole protection portion is attached to a side portion of the shoe.

In accordance with one embodiment of the invention as shown in FIG. 12, the shoe cover unit 10-1 may have a supported portion 13 horizontally formed at a lower end portion thereof. The supported portion 13 is supported on a sole edge 2c projecting outwardly at the side portion B of the shoe 2 such as work shoes, golf shoes, leather shoes, etc., so that the shoe cover unit 10-1 embraces and protects the upper 2a in a more stable manner. In this case, the shoe cover unit 10-1 may have an auxiliary sole protection portion 14 to vertically extend from an outermost point of the supported portion 13. In this way, the upper 2a at the side portion B of the shoe 2 may be embraced and protected by a main portion of the shoe cover unit 10-1 while the sole edge 2c at the side portion B of the shoe 2 may be embraced and protected by the auxiliary sole protection portion 14 of the shoe cover unit 10-1.

Figure 13:
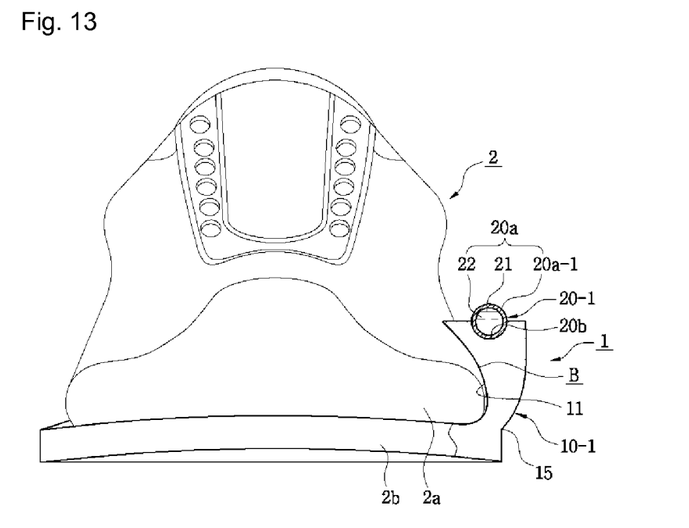
FIG. 13 is a front elevation view illustrating a state in which a level device for a shoe according to one embodiment of the invention including a shoe cover unit having a connection portion is attached to a side portion of the shoe.

In accordance with one embodiment of the invention as shown in FIG. 13, the shoe cover unit 10-1 may have a connection portion 15 formed at a lower end portion thereof so as to be connected to a side end or edge of the sole 2b of the shoe 2. Thus, the shoe cover unit 10-1 is integrated with the sole 2b of the shoe 2. In this way, when manufacturing the shoe 2, both the shoe cover unit 10-1 and the sole 2b may be attached to the upper 2a at once, thereby simplifying the manufacturing process of the shoe 2 and thus improving the productivity of the shoe 2.

In accordance with one embodiment of the present invention, the surface measuring unit 20-1 is configured such that a straight elongated groove 20b is formed in a front-back direction in a flat surface of the upper portion of the shoe cover unit 10-1 and a straight elongated level unit 20a is inserted in and mounted on the elongated groove 20b so that an upper portion thereof projects from the flat surface. Thus, the shoe-wearer may visually determine, using the surface measuring unit 20-1, whether a location where the wearer is standing is level or not and if not, the direction and extent of the grade.

Figure 14:
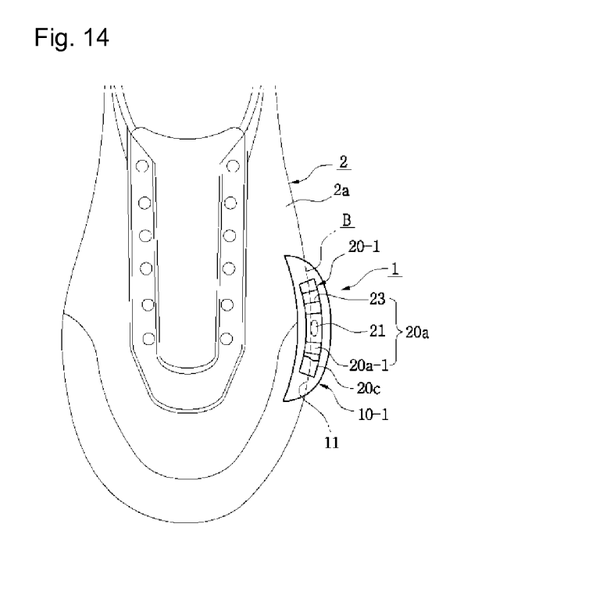
FIG. 14 is a partial top view illustrating a state in which a level device for a shoe according to one embodiment of the invention including a surface measuring unit having a curved elongated level unit is attached to a side portion of the shoe.

Alternatively, as shown in FIG. 14, the surface measuring unit 20-1 may be configured such that a curved elongated groove 20c is formed in a front-back direction in a flat surface of the upper portion of the shoe cover unit 10-1 and a curved elongated level unit 20a is inserted in and mounted on the curved elongated groove 20c so that an upper portion thereof projects from the flat surface. Moreover, the grooves 20b and/or 20c may have any one of a semi-cylindrical shape and an elongated hexahedral shape. The shape of the grooves is not limited thereto. Thus, the shoe-wearer may visually determine, using the surface measuring unit 20-1, whether a location where the wearer is standing is level or not and if not, the direction and extent of the grade.

Here, the straight elongated groove 20b and/or the curved elongated groove 20c are formed in the flat surface of the upper portion of the shoe cover unit 10-1 so as to have any one of a semi-cylindrical shape and an elongated hexahedral shape. The straight elongated level unit 20a and/or the curved elongated level unit 20a are formed to have any one of a semi-cylindrical shape and an elongated hexahedral shape in a corresponding manner to the shape of the straight elongated groove 20b and/or the curved elongated groove 20c. The straight elongated level unit 20a and/or the curved elongated level unit 20a are respectively fitted in the straight and/or curved elongated grooves 20b and 20c. At this time, there may be used an adhesive agent in order to fix the straight elongated level unit 20a and/or the curved elongated level unit 20a to the straight and/or curved elongated grooves 20b and 20c respectively. The upper portions of the straight and/or curved elongated level units 20a are not buried in the straight and curved elongated grooves 20b and 20c and, hence, project upwardly from the flat surface of the upper portion of the shoe cover unit 10-1. The projected upper portions of the straight and curved elongated level units 20a have any one of the semi-cylindrical shape and the elongated hexahedral shape.

In accordance with one embodiment of the invention, the level unit 20a of the surface measuring unit 20-1 is formed as follows. A separate transparent case 20a-1 having an open side receives, through the open side, liquid 22 containing a bubble 21 therein, and the open side of the transparent case 20a-1 is sealed in a state in which liquid 22 is received in the case 20a-1, and a plurality of scales 23 is marked on an outer surface of the case 20a-1 at a regular interval in a longitudinal direction, and then the separate transparent case 20a-1 is fitted in and fixed to the curved or straight elongated groove 20c or 20b formed in the flat surface of the upper portion of the shoe cover unit 10 such that the scales 23 are exposed to the outside. Therefore, the bubble 21 in the transparent case 20a-1 may move and point to the scale 23 depending on whether a location where the wearer is standing is level or not and if not, the direction and extent of the grade. At this time, by reading the scale, the wearer may visually determine whether a location where the wearer is standing is level or not and if not, the direction and extent of the grade. The open side of the separate transparent case 20a-1 may be sealed by the same transparent material as the material of the transparent case using thermal attachment or via an adhesive agent, etc.

Figure 15:
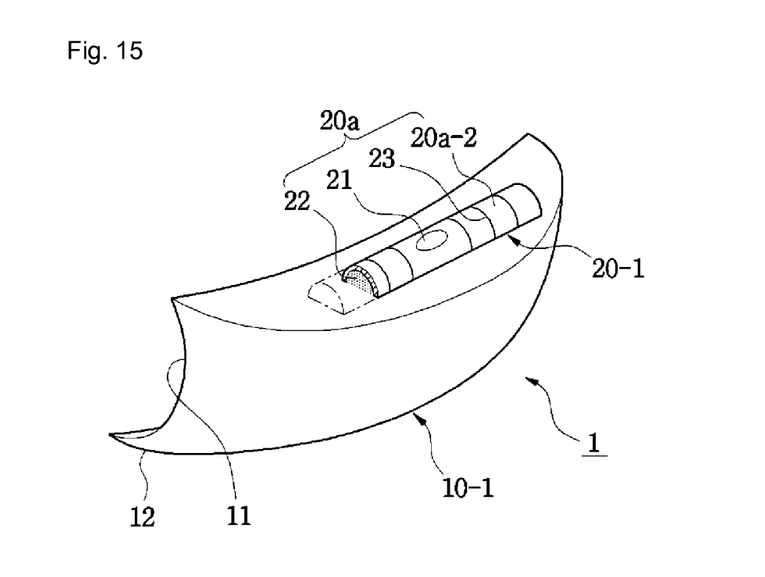
FIG. 15 is a partial perspective view of a level device for a shoe according to one embodiment of the invention, for a side portion of the shoe, including a surface measuring unit having a level unit formed with an integrated transparent case.

In accordance with one embodiment of the invention as shown in FIG. 15, the level unit 20a of the surface measuring unit 20-1 is formed as follows. A transparent case 20a-2 is formed in an integrated manner with the shoe cover unit 10-1 so as to project upwardly from the surface of the upper portion of the shoe cover unit 10-1 using a transparent material and to have one open side, and liquid 22 is injected into the transparent case 20a-2 through the open side so as to contain the bubble 21 therein, and the open side of the transparent case 20a-2 is sealed in a state in which liquid 22 is received in the case 20a-2, and a plurality of scales 23 is marked on an outer surface of the case 20a-2 at a regular interval in a longitudinal direction. In this manner, the level unit 20a of the surface measuring unit 20-1 is integrated with the shoe cover unit 10-1, and, hence, both the shoe cover unit 10-1 and the surface measuring unit 20-1 may be formed using a single mold at once. This may greatly reduce a mold cost for the level device 1 for the shoe and thus a manufacturing cost of the level device 1. The integrated transparent case 20a-2 may be formed to have any one of a semi-cylindrical shape and an elongated hexahedral shape while having one open side. The open side of the integrated transparent case 20a-2 may be sealed using a transparent sealing material after liquid 22 has been injected therethrough.

Figure 16:
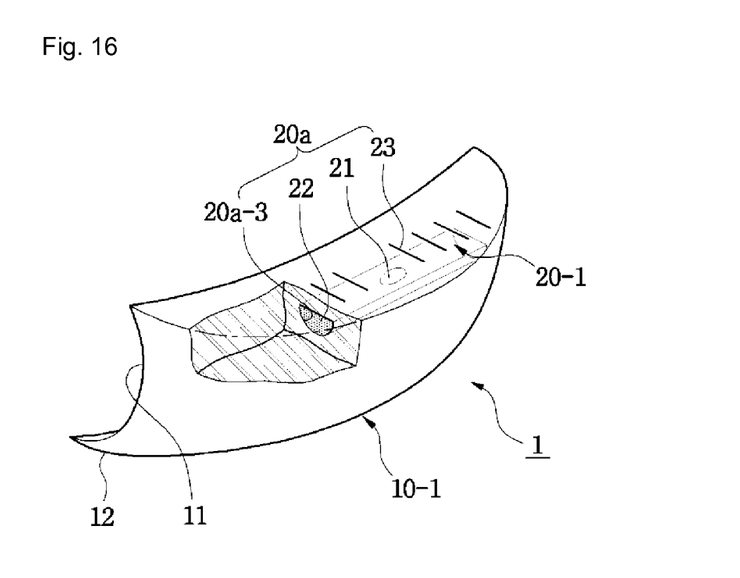
FIG. 16 is a partial perspective view of a level device for a shoe according to one embodiment of the invention, for a side portion of the shoe, including a surface measuring unit having a level unit in a form of a level formation elongated hole.

In accordance with one embodiment of the invention as shown in FIG. 16, the level unit 20a of the surface measuring unit 20-1 is formed as follows. A level formation elongated hole 20a-3 is formed to be buried beneath the surface of the upper portion of the shoe cover unit 10-1 made of a transparent material so as to have one side portion communicating with the outside, and liquid 22 is injected into the level formation elongated hole 20a-3 through one side portion communicating with the outside so as to contain the bubble 21 therein, and one side portion communicating with the outside is sealed in a state in which liquid 22 is received in the hole 20a-3, and a plurality of scales 23 is marked on the surface of the upper portion of the shoe cover unit 10-1 at a regular interval in a longitudinal direction so as to be disposed immediately over the level formation elongated hole 20a-3. In this manner, the level unit 20a of the surface measuring unit 20-1 is buried in the transparent shoe cover unit 10-1, and, hence, may be protected from external impact. Thus, the surface measuring unit 20-1 may be prevented from damage and thus have an extended lifespan. The level formation elongated hole 20a-3 may be formed to have any one of a semi-cylindrical shape and an elongated hexahedral shape while having one side portion communicating with the outside. One side portion communicating with the outside may be sealed using a transparent sealing material after liquid 22 has been injected therethrough.

Figure 17:
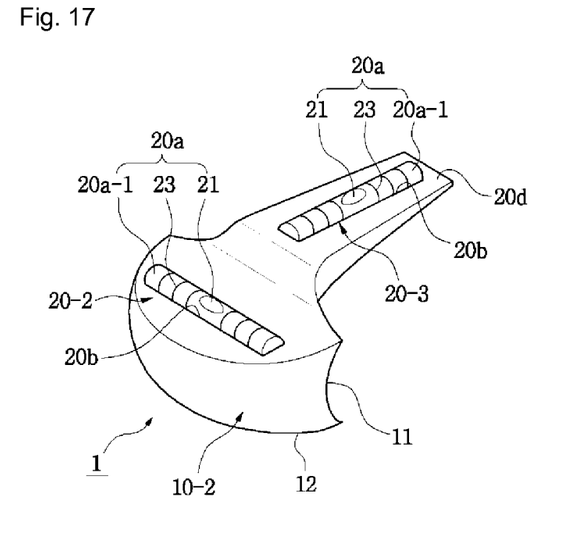
FIG. 17 is a partial perspective view of a level device for a shoe according to another embodiment of the invention.
Figure 18:
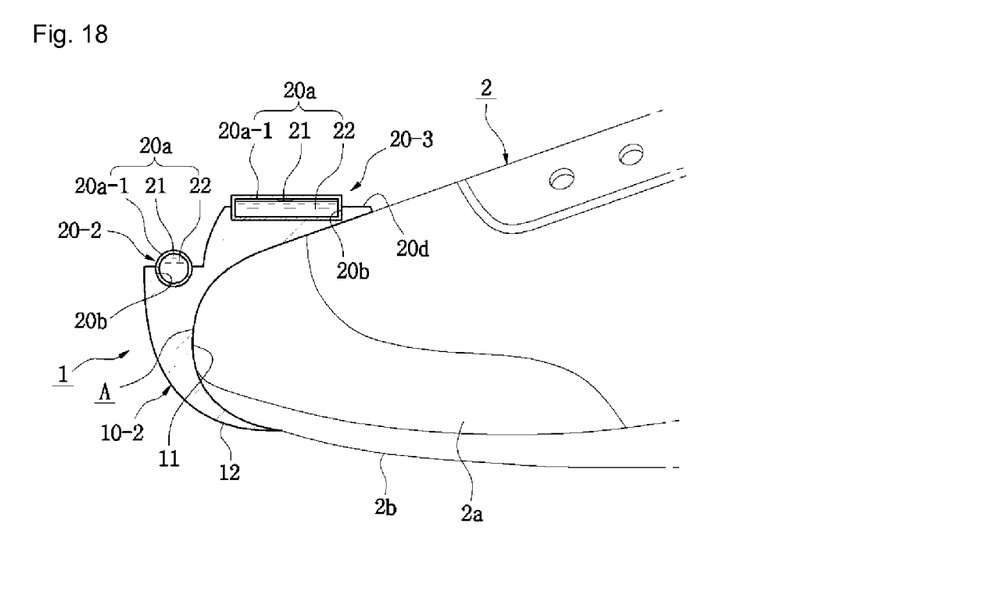
FIG. 18 is a side elevation illustrating a state in which the level device for a shoe of FIG. 17 is attached to a shoe.

FIG. 17 and FIG. 18 illustrate a level device according to another embodiment of the invention.

In accordance with this embodiment of the invention, a level device 1 for a shoe includes a shoe cover unit 10-2 made of a material having excellent wear-resistance and impact resistance to be configured to be attachable to a front portion A of a shoe 2 so as to embrace the front portion A of the shoe 2, an X-directional surface-measuring unit 20-2 having a level unit 20a disposed in an X direction at an upper portion of the shoe cover unit 10-2, and a Y-directional surface-measuring unit 20-3 having a level unit 20a disposed in a Y direction at an extension extending inwardly from the upper portion of the shoe cover unit 10-2. The X direction may be a left-right direction while the Y direction may be a front-back direction.

In accordance with the level device 1 for a shoe of this embodiment of the invention, using the X-directional and Y-directional surface-measuring units 20-2 and 20-3 having the level units 20a respectively disposed in the X and Y directions in the upper portion of the shoe cover unit 10-2 configured to be attachable to the front portion A of the shoe 2, the wearer of the shoe 2 may visually determine whether a location where the wearer is standing is level or not and if not, the direction and extent of the grade in the left-right direction and front-back direction at the same time.

In accordance with this embodiment of the invention, the shoe cover unit 10-2 has an arcuate form and has an inner facing surface 11 in a concave shape which faces and attaches to the front portion A of the shoe 2. The shoe cover unit 10-2 may prevent the front portion A of the shoe 2 from damage due to friction against or collision with the ground or other objects. The inner facing surface 11 of the shoe cover unit 10-2 is securely attached to the front portion A of the shoe 2 using an adhesive agent applied to the inner facing surface 11.

The thickness of the shoe cover unit 10-2 may be increasingly small from the upper portion thereof to a lower portion thereof. The shoe cover unit 10-2 may have a sole protection portion 12 to extend inwardly in a curved manner at a lower end portion thereof so as to cover a sole 2b as shown in FIG. 18. Thus, the shoe cover unit 10-2 may embrace and protect both an upper 2a and the sole 2b at the front portion A of the shoe 2 not including an edge projecting outwardly such as the exercise shoes, etc.

In accordance with this embodiment of the invention, the X-directional surface-measuring unit 20-2 is configured such that a straight elongated groove 20b is formed in a left-right direction in a surface of the upper portion of the shoe cover unit 10-2 and a straight elongated level unit 20a disposed in the X direction is inserted in and mounted on the straight elongated groove 20b so that an upper portion thereof projects from the surface of the upper portion of the shoe cover unit. The Y-directional surface-measuring unit 20-2 is configured such that a straight elongated groove 20b is formed in a front-back direction in an upper surface of an extension 20d extending inwardly from an inner central side of the upper portion of the shoe cover unit 10-2 and a straight elongated level unit 20a disposed in the Y direction is inserted in and mounted on the straight elongated groove 20b so that an upper portion thereof projects from the upper surface of the extension 20d.

Each of the level units 20a of the X-directional and Y-directional surface-measuring units 20-2 and 20-3 is formed as follows. Each of separate transparent cases 20a-1 having an open side receives, through the open side, liquid 22 containing a bubble 21 therein, and the open side of each of the transparent cases 20a-1 is sealed in a state in which liquid 22 is received in each of the cases 20a-1, and a plurality of scales 23 is marked on an outer surface of each of the transparent cases 20a-1 at a regular interval in a longitudinal direction, and then the separate transparent cases 20a-1 are respectively fitted in and fixed to the straight elongated grooves 20b formed in the X direction and Y direction respectively in the surface of the upper portion of the shoe cover unit 10-2 and the upper surface of the extension of the shoe cover unit 10-2 such that the scales 23 are exposed to the outside. Therefore, each of the bubbles 21 in the transparent cases 20a-1 disposed in the X direction and Y direction moves and points to each scale 23 depending on whether a location where the wearer is standing is level or not and if not, the direction and extent of the grade in the left-right direction and the front-back direction respectively. At this time, by reading each scale 23, the wearer may visually determine whether a location where the wearer is standing is level or not and if not, the direction and extent of the grade in the left-right direction and the front-back direction at once. The open side of each of the separate transparent cases 20a-1 may be sealed by the same transparent material as the material of each of the transparent cases using thermal attachment or via an adhesive agent, etc.

What is claimed is:

1. A level device for a shoe, the level device comprising:
    a shoe cover unit made of a material having wear-resistance and impact-resistance, the shoe cover unit being configured to be attachable to a front portion of a shoe so as to embrace the front portion of the shoe; and
    a surface measuring unit including a level unit disposed at the shoe cover unit to enable a visual check of a surface state of a given location.

2. The device of claim 1, wherein a thickness of the shoe cover unit gradually decreases from an upper portion thereof to a lower portion thereof, and
    wherein the shoe cover unit includes a sole protection portion inwardly extending in a curved manner at a lower end portion thereof.

3. The device of claim 1, wherein the shoe cover unit includes a supported portion horizontally formed at a lower end portion thereof.

4. The device of claim 1, wherein the shoe cover unit includes a connection portion formed at a lower end portion thereof to be connected to a front end of a sole of the shoe in an integrated manner.

5. The device of claim 1, wherein the surface measuring unit is configured such that a straight elongated groove is formed in a left-right direction in a flat surface of an upper portion of the shoe cover unit and the level unit is a straight elongated level unit inserted in and mounted on the straight elongated groove so that an upper portion thereof projects from the flat surface.

6. The device of claim 1, wherein the surface measuring unit is configured such that a curved elongated groove is formed in a left-right direction in a flat surface of an upper portion of the shoe cover unit and a curved elongated level unit is inserted in and mounted on the curved elongated groove so that an upper portion thereof projects from the flat surface.

7. The device of claim 1, wherein the level unit of the surface measuring unit is configured such that a separate transparent case having an open side receives, through the open side, liquid containing a bubble therein, and the open side of the separate transparent case is sealed in a state in which the liquid is received in the case, and a plurality of scales is marked on an outer surface of the separate transparent case at a regular interval in a longitudinal direction, and the separate transparent case is fitted in and fixed to a straight elongated groove formed in an upper surface of the shoe cover unit such that the plurality of scales is exposed to an outside of the shoe cover unit.

8. The device of claim 1, wherein the level unit of the surface measuring unit is configured such that a transparent case is formed in an integrated manner with the shoe cover unit so as to project upwardly from an upper surface of the shoe cover unit using a transparent material and to have one open side, and liquid is injected into the integrated transparent case through the open side so as to contain a bubble therein, and the open side of the integrated transparent case is sealed in a state in which the liquid is received in the integrated transparent case, and a plurality of scales is marked on an outer surface of the integrated transparent case at a regular interval in a longitudinal direction.

9. The device of claim 1, wherein:
    the level unit of the surface measuring unit is configured such that a level formation elongated hole is formed to be located beneath an upper surface of the shoe cover unit made of a transparent material so as to have one side portion communicating with an outside thereof,
    liquid is injected into the level formation elongated hole through the one side portion communicating with the outside so as to contain the bubble therein,
    the one side portion communicating with the outside is sealed in a state in which the liquid is received in the level formation elongated hole, and
    a plurality of scales is marked on the upper surface of the shoe cover unit at a regular interval in a longitudinal direction so as to be disposed immediately over the level formation elongated hole.

10. A level device for a shoe, the level device comprising:
    a shoe cover unit made of a material having wear-resistance and impact-resistance, the shoe cover unit being configured to be attachable to a side portion of the shoe so as to embrace the side portion of the shoe; and a surface measuring unit including a level unit disposed at the shoe cover unit to enable a visual check of a surface state of a given location.

11. The device of claim 10, wherein a thickness of the shoe cover unit gradually decreases from an upper portion thereof to a lower portion thereof, and
wherein the shoe cover unit includes a sole protection portion inwardly extending in a curved manner at a lower end portion thereof.

12. The device of claim 10, wherein the shoe cover unit includes a supported portion horizontally formed at a lower end portion thereof.

13. The device of claim 10, wherein the shoe cover unit includes a connection portion formed at a lower end portion thereof to be connected to a front end of a sole of the shoe in an integrated manner.

14. The device of claim 10, wherein the surface measuring unit is configured such that a straight elongated groove is formed in a left-right direction in a flat surface of an upper portion of the shoe cover unit and a straight elongated lever unit is inserted in and mounted on the straight elongated groove so that an upper portion thereof projects from the flat surface.

15. The device of claim 10, wherein the surface measuring unit is configured such that a curved elongated groove is formed in a left-right direction in a flat surface of an upper portion of the shoe cover unit and a curved elongated level unit is inserted in and mounted on the curved elongated groove so that an upper portion thereof projects from the flat surface.

16. The device of claim 10, wherein:
the level unit of the surface measuring unit is configured such that a separate transparent case having an open side receives, through the open side, liquid containing a bubble therein,
the open side of the separate transparent case is sealed in a state in which the liquid is received in the separate transparent case,
a plurality of scales is marked on an outer surface of the separate transparent case at a regular interval in a longitudinal direction, and
the separate transparent case is fitted in and fixed to a straight elongated groove formed in an upper surface of the shoe cover unit such that the plurality of scales is exposed to an outside of the shoe cover unit.

17. The device of claim 10, wherein:
the level unit of the surface measuring unit is configured such that a transparent case is formed in an integrated manner with the shoe cover unit so as to project upwardly from an upper surface of the shoe cover unit using a transparent material and to have one open side,
liquid is injected into the integrated transparent case through the open side so as to contain a bubble therein,
the open side of the integrated transparent case is sealed in a state in which the liquid is received in the integrated transparent case, and
a plurality of scales is marked on an outer surface of the integrated transparent case at a regular interval in a longitudinal direction.

18. The device of claim 10, wherein the level unit of the surface measuring unit is configured such that a level formation elongated hole is formed to be located beneath an upper surface of the shoe cover unit made of a transparent material so as to have one side portion communicating with an outside thereof, and liquid is injected into the level formation elongated hole through the one side portion communicating with the outside so as to contain a bubble therein, and the one side portion communicating with the outside is sealed in a state in which the liquid is received in the level formation elongated hole, and a plurality of scales is marked on the upper surface of the shoe cover unit at a regular interval in a longitudinal direction so as to be disposed immediately over the level formation elongated hole.

19. A level device for a shoe, the level device comprising:
a shoe cover unit made of a material having wear-resistance and impact resistance, the shoe cover unit being configured to be attachable to a front portion so as to embrace the front portion of the shoe;
a X-directional surface-measuring unit having a level unit disposed in a X direction at an upper portion of the shoe cover unit; and
a Y-directional surface-measuring unit having a level unit disposed in a Y direction at an extension extending inwardly from the upper portion of the shoe cover unit.

20. The device of claim 19, wherein a thickness of the shoe cover unit gradually decreases from the upper portion thereof to a lower portion thereof, and
wherein the shoe cover unit includes a sole protection portion inwardly extending in a curved manner at a lower end portion thereof.

21. The device of claim 19, wherein the X-directional surface-measuring unit is configured such that a straight elongated groove is formed in a left-right direction in a surface of the upper portion of the shoe cover unit, and a straight elongated level unit disposed in the X direction is inserted in and mounted on the straight elongated groove so that an upper portion thereof projects from the surface of the upper portion of the shoe cover unit, and
wherein the Y-directional surface-measuring unit is configured such that another straight elongated groove is formed in a front-back direction in an upper surface of the extension extending inwardly from an inner central side of the upper portion of the shoe cover unit, and another straight elongated lever unit disposed in the Y direction is inserted in and mounted on the another straight elongated groove so that an upper portion thereof projects from the upper surface of the extension.

22. The device of claim 19, wherein each of the level units of the X-directional and Y-directional surface-measuring units is configured such that each of separate transparent cases, each having an open side, receives, through the open side, liquid containing a bubble therein,
the open side of each of the separate transparent cases is sealed in a state in which the liquid is received in each of the separate transparent cases,
a plurality of scales is marked on an outer surface of each of the separate transparent cases at a regular interval in a longitudinal direction, and
the separate transparent cases are respectively fitted in and fixed to straight elongated grooves formed in the X direction and Y direction respectively in a surface of the upper portion of the shoe cover unit and an upper surface of the extension of the shoe cover unit such that the plurality of scales is exposed to an outside of the straight elongated grooves.

* * * * *